United States Patent
Lipowski (10) Patent No.: US 11,205,842 B2
(45) Date of Patent: Dec. 21, 2021

(54) POINTING ALGORITHM FOR ENDPOINT NODES

(71) Applicant: Starry, Inc., Boston, MA (US)

(72) Inventor: Joseph Thaddeus Lipowski, Norwell, MA (US)

(73) Assignee: Starry, Inc., Boston, MA (US)

( * ) Notice: Subject to any disclaimer, the term of this patent is extended or adjusted under 35 U.S.C. 154(b) by 340 days.

(21) Appl. No.: 15/984,713

(22) Filed: May 21, 2018

(65) Prior Publication Data

US 2018/0337452 A1 Nov. 22, 2018

Related U.S. Application Data

(60) Provisional application No. 62/508,539, filed on May 19, 2017.

(51) Int. Cl.
| | |
|---|---|
| *H01Q 3/22* | (2006.01) |
| *H04L 1/00* | (2006.01) |
| *H04B 7/0408* | (2017.01) |
| *H04B 7/06* | (2006.01) |
| *H04B 7/08* | (2006.01) |

(52) U.S. Cl.
CPC ............ *H01Q 3/22* (2013.01); *H04B 7/0408* (2013.01); *H04B 7/063* (2013.01); *H04B 7/0617* (2013.01); *H04B 7/0632* (2013.01); *H04B 7/0842* (2013.01); *H04L 1/0003* (2013.01); *H04L 1/0009* (2013.01); *H04L 1/0015* (2013.01); *H04L 1/0026* (2013.01); *H04L 1/0045* (2013.01); *H04B 7/0814* (2013.01)

(58) Field of Classification Search
CPC .... H04B 7/0408; H04B 7/0617; H04B 7/063; H04B 7/0632; H04B 7/0842; H04L 1/0003; H04L 1/0009; H04L 1/0015; H04L 1/0026; H04L 1/0045; H01Q 3/22
See application file for complete search history.

(56) References Cited

U.S. PATENT DOCUMENTS

| | | | |
|---|---|---|---|
| 2017/0215089 A1 | 7/2017 | Lipowski et al. | |
| 2018/0054251 A1* | 2/2018 | Alex | ................. G01S 19/54 |
| 2018/0145744 A1* | 5/2018 | Petranovich | ....... H04B 7/18508 |
| 2019/0364492 A1* | 11/2019 | Azizi | ............... H04W 52/0264 |

* cited by examiner

*Primary Examiner* — Dao L Phan
(74) *Attorney, Agent, or Firm* — HoustonHogle LLP (57) ABSTRACT

A terrestrial high frequency data communication system and method for implementing a pointing algorithm for endpoint nodes are described. The system includes an aggregation node and one or more endpoint nodes. In one example, a pointing direction for an endpoint node is determined based on a number of packet error rate (PER) measurements associated with a high frequency data communication link between the endpoint node and an aggregation node. Preferably, the endpoint node includes a steerable antenna module that includes one or more antennas. The steerable antenna module is configured to receive an azimuth value and an elevation value determined based on PER measurements associated with the high frequency data communication link, and to steer its one or more antennas based on the azimuth value and the elevation value to point to the aggregation node.

13 Claims, 7 Drawing Sheets

POINTING ALGORITHM FOR ENDPOINT NODES

RELATED APPLICATIONS

This application claims the benefit under 35 USC 119(e) of U.S. Provisional Application No. 62/508,539 filed on May 19, 2017, which is incorporated herein by reference in its entirety.

BACKGROUND OF THE INVENTION

In some areas, internet service providers (ISPs) use fixed wireless network access technology to deliver network connectivity to subscribers' premises. The ISPs transmit and receive data to and from endpoint nodes at the subscribers' premises as radio waves via transmission towers. This has been typically used in rural areas where other networks, such as cable and optical fiber networks, are not available.

Typically, interference from various entities and the noise generated by these entities can negatively impact the channel/signal quality of the wireless links between the ISPs and the endpoint nodes.

SUMMARY OF THE INVENTION

In order to mitigate unwanted signal interference, an improved pointing mechanism for the endpoint nodes is provided. The pointing mechanism allows each endpoint node to accurately point to an aggregation node, typically maintained by an ISP, to set up a high quality data communication link with the aggregation node.

In particular, the proposed systems described herein utilize terrestrial high frequency wireless data communication networks. These networks typically operate in the 10 GHz to 300 GHz band for communications between aggregation nodes and one or more high frequency endpoint nodes such as fixed subscriber nodes and/or multi-dwelling unit nodes, usually in star-topology networks.

Additionally, the technology of the proposed system also has application to mobile and semi-mobile applications and point-to-point links. This spectral band encompasses millimeter wavelengths (mm-wave) that are traditionally described as covering the 30 GHz to 300 GHz frequency band, and also extends to lower frequencies to 10 GHz, for example.

In general, according to one aspect, the invention features a high frequency data communications system such as a terrestrial Extra High Frequency (EHF) data communication system operating in the 10 GHz to 300 GHz band. The system comprises an aggregation node and at least one endpoint node configured to communicate with the aggregation node via a high frequency communications link. The endpoint node includes a steerable antenna module that includes one or more antennas. The steerable antenna module is configured to receive an azimuth value and an elevation value determined based on packet error rate (PER) measurements associated with the high frequency data communication link, and to steer one or more of its antennas based on the azimuth value and the elevation value to point to the aggregation node.

Typically, the PER measurements are performed for different azimuth and elevation values.

In one implementation, the aggregation node includes a phased array antenna system that divides an area of coverage into multiple subsectors. For this purpose, in one example, the phased array antenna system includes at least one receive phased array antenna for receiving information from the endpoint node. In another example, the phased array antenna system includes at least one transmit phased array antenna for transmitting information to the endpoint node.

In examples, the one or more antennas of the steerable antenna module can be one or more patch array antennas, or can be one or more parabolic dish antennas.

In general, according to another aspect, the invention features a method for determining a pointing direction for an endpoint node in a terrestrial extra high frequency data communication system. This method comprises determining a pointing direction based on packet error rate (PER) measurements associated with a high frequency data communication link between the endpoint node and an aggregation node, and steering one or more antennas of the endpoint node to point to the aggregation node according to the pointing direction.

Preferably, determining the pointing direction comprises determining azimuth and elevation values to be used for steering the one or more antennas.

The method also comprises selecting a modulation and coding scheme (MCS) level, measuring a PER at the MCS level, and adjusting the pointing direction when the PER is greater than or equal to a threshold value.

In one example, the method selecting the MCS level based on a received signal strength indicator (RSSI) value and noise.

Typically, adjusting the pointing direction comprises testing the PER at different azimuth values, and selecting a particular azimuth value with a lowest PER. Adjusting the pointing direction might also include testing the PER at the particular azimuth value and different elevation values, and selecting a particular elevation value with a lowest PER.

In another example, the method performs a tracking operation when the PER is less than the threshold value. Typically, performing the tracking operation comprises determining a tracked azimuth value and a tracked elevation value based on packets received over a period of time.

In general, according to yet another aspect, the invention features an endpoint node that communicates with an aggregation node via high frequency data communication links. The endpoint node comprises a controller configured to determine a pointing direction based on measurement of packet error rate (PER) at different azimuth and elevation values, and a steerable antenna module configured to steer one or more antennas based on the pointing direction.

Preferably, the steerable antenna module includes a motor unit that mechanically steers the one or more antennas. In examples, the different azimuth values comprise an initial azimuth value +/−1 beamwidth, and the different elevation values comprise an initial azimuth value +/−1 beamwidth.

In examples, the controller might be further configured to select a particular azimuth value of the different azimuth values with a lowest PER, and to select a particular elevation value of the different elevation values with a lowest PER.

Additionally, the steerable antenna module includes a communication module that includes the one or more antennas. In one example, the one or more antennas are integrated patch array antennas with transceivers.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
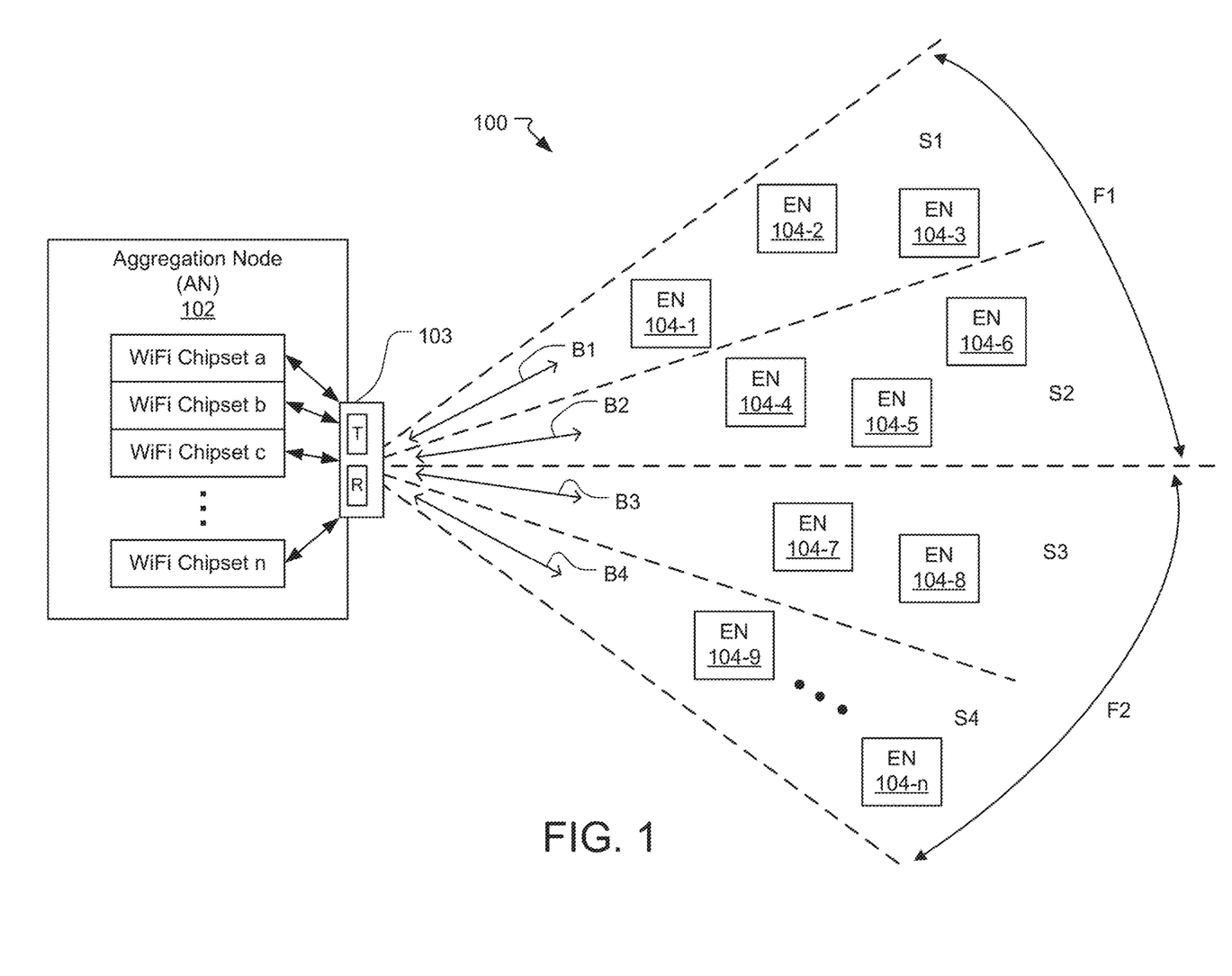
FIG. 1 is a block diagram showing an exemplary deployment of an aggregation node and endpoint nodes in a terrestrial high frequency communication system.

A terrestrial high frequency communication system 100 illustrated in FIG. 1 shows an aggregation node (AN) 102 and a plurality of high frequency network endpoint nodes (EN) 104, e.g., 104-1, 104-2, . . . , and 104-n.

The aggregation node 102 utilizes a phased array antenna system 103 to communicate with the endpoint nodes 104-1-104-n. The antenna system 103 preferably covers an azimuthal arc of between about 45 degrees and 180 degrees. Often, an azimuthal arc of about 120 degrees is used.

The operation of the phased array antenna system 103 then divides the antenna's area of coverage into multiple subsectors S1, S2, . . . , Sn. In the illustrated example, subsectors S1 through S4 are distributed in an azimuthal fan, with the subsectors adjoining one another. There are at least two subsectors; with some embodiments having four, eight or more subsectors. As a result, in typical implementations, each subsector S covers an azimuthal arc of between possibly 8 degrees and 60 degrees. Currently, the subsector azimuthal arc is between about 10 degrees and 25 degrees.

The phased array antenna system 103 forms transmit and receive beams B1-Bn that correspond to each of the subsectors. In this way, the aggregation node 102 reduces interference between endpoint nodes, conserves power on the downlinks and reduces transmit power requirements by the endpoint nodes on the uplinks. Four exemplary transmit/receive beams B1 through B4 that correspond to sectors S1 through S4, respectively, are shown.

The endpoint nodes EN 104 are distributed within and thereby associated with different subsectors. For example, subscriber endpoint nodes EN 104-1, 104-2, and 104-3 are associated with subsector S1, subscriber endpoint nodes EN 104-4, 104-5, and 104-6 are associated with subsector S2, subscriber endpoint nodes EN 104-7 and 104-8 are associated with subsector S3, and subscriber endpoint nodes EN 104-9 to 104-n are associated with subsector S4.

In some embodiments, the phased array antenna system 103 produces a number of beams for the subscriber node/group of subscriber nodes in each subsector S1, S2, . . . , Sn. The phased array antenna system 103 typically includes one or more transmit phased array antennas T for transmitting data streams to the endpoint nodes 104 and one or more receive phased array antennas R for receiving data streams from the endpoint nodes 104.

Each endpoint node 104 communicates with the aggregation node 102 by means of an electronic assembly or system that provides a wireless ISP (internet service provider) handoff at the premises where the endpoint node 104 is installed. The endpoint node 104 is a residential or business fixed wireless endpoint that communicates with the aggregation node 102 via a terrestrial high frequency network (i.e., using high frequency communication links/radios). In some embodiments, the high frequency network operates between 10 and 300 GHz, or more commonly between about 20 and 60 GHz. In order to receive the beams B1-Bn from the aggregation node 102, one or more patch array antennas included in the electronic assembly at the endpoint node 104 are steered to point at the aggregation node 102.

Locally each endpoint node 104, in a typical residential implementation, communicates with a modem/router or access point over possibly a WiFi tunnel (in the 2.4 or 5 GHz bands or the WiGig tri-band in the 2.4, 5 and 60 GHz bands, or IEEE 802.11ac/IEEE 802.11ad-2012 or via a wired connection (e.g., 1000BASE-T). This modem/router or access point then maintains the local area network at the subscriber's premises.

In other cases, the endpoint node 104 itself maintains the wired and/or wireless LAN at the premises. It provides typical functions associated with LAN routers, such as Network Address Translation (NAT), guest networks, Parental Controls and other Access Restrictions, VPN Server and Client Support, Port Forwarding and UPnP, and DHCP (Dynamic Host Configuration Protocol) server that automatically assigns IP addresses to network devices on the LAN.

According to a preferred embodiment, the aggregation node 102 includes multiple WiFi chipsets a, b, c . . . n. These WiFi chipsets are commercially available systems or assemblies of one or more chips that implement the IEEE 802.11 standard as an access point. These chipsets are capable of maintaining multiple downlink or downlink and uplink spatial streams such as provided by the IEEE 802.11n or 802.11ac or 802.1 lax versions and follow-on versions of the standard. Each of these WiFi chipsets produce WiFi signals, which are signals that have been encoded according to the IEEE 802.11 standard. These WiFi signals are then upconverted and transmitted to the endpoint nodes 104. In turn, the endpoint nodes transmit high frequency signals back, which signals are downconverted to WiFi signals at the conventional frequencies such as 2.4 or 5 GHz.

These WiFi chipsets are allocated to their own (e.g. one or more) subsectors. Further, their WiFi signals are also preferably up and down converted to different carrier frequencies to minimize inter-chipset interference. Thus, for example, WiFi chipset "a" might communicate with endpoint nodes in subsectors S1 and S2 at frequency F1, whereas WiFi chipset "b" might communicate with nodes in subsectors S3 and S4 at frequency F2.

Figure 2:
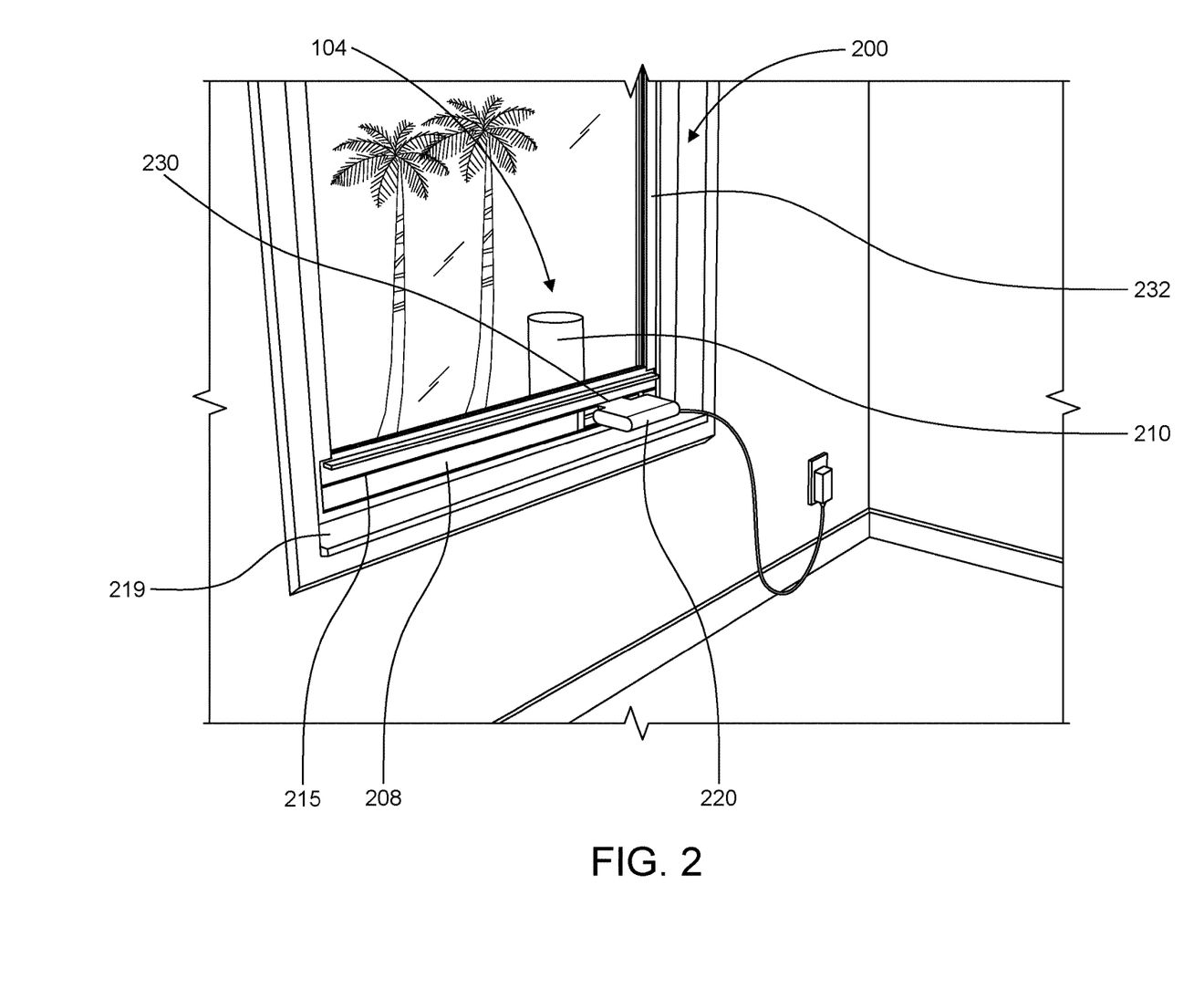
FIG. 2 is a perspective view of an endpoint node installed at a subscriber's premise.

FIG. 2 shows an example of an endpoint node 104 mounted/installed at a window 200 of a subscriber's premises, such as a residence. The view of the figure is from the inside of the residence. A lower sash 232 of a double hung window 200 is shown.

The endpoint node 104 has an outdoor unit (ODU) 210 coupled to an indoor unit (IDU) 220 by a bridge unit 230. This exemplary endpoint node 104 is mounted in a manner similar to that of a window air-conditioning unit. Specifically, with reference to the illustrated double hung window 200, the subscriber node 104 is placed on a windowsill 219 of the window 200. Then, a bottom rail 215 of the lower sash 232 is closed against a sealing member 208. In particular, the bottom rail 215 of the lower sash 232 of the window 200 clamps the sealing member 208 against the window's sill 219. This leaves the IDU 220 on the inside of the subscriber's premises and the ODU 210 exposed on the outside of the subscriber's premises (i.e., outside the window 200). The bridge unit 230 extends through the sealing member 208 and mechanically supports both the ODU 210 and the IDU 220 on the windowsill 219. The bridge unit 230 provides structural support for the assembly, as well as acts as a conduit for electrical cables between the ODU 210 and the IDU 220.

In other embodiments, the IDU 220 and ODU 210 are connected by one or more cables, such as ribbon cables that extend under the closed window 200, but are otherwise physically separated, and can be detached from each other.

The ODU 210 is configured for high frequency communications with the aggregation node 102, and the DU 220 is configured for WiFi communications (or wired connections or communications over another unlicensed band) with one or more devices inside the subscriber's premise. In some embodiments, the IDU 220 can communicate with a router access point or directly with one or more user devices at the subscriber's premise. The bridge unit 230 includes one or more interconnection cables for coupling the ODU 202 with the DU 204, and a DC power module, e.g., one that can be powered by a wall outlet.

On the other hand, in still other embodiments, the endpoint nodes 104 are not separated into IDU 220, ODU 210, and bridge units 230. Instead, in one case, all of the necessary electronics are contained within a single housing that is installed on an outer wall or window of the premises. In one specific example, the electronics of the ODU 210 and IDU 220 are contained in a weatherproof case, which then magnetically mounts to the glass or glazing of a window.

In other examples, the IDU 220 is located inside the subscriber's premises on the interior side of an outer wall or near an outer wall of the premises. The ODU 210 is located on an exterior side of the outer wall. For example, in some implementations, a hole is drilled through the outer wall such as in the attic of the premises. In other examples, a hole is drilled through the roof of the residence. Then, the ODU 210 is mounted on the outside. The IDU 220 is mounted on an adjacent interior surface of the roof or wall, such as mounted between rafters or studs.

Figure 3:
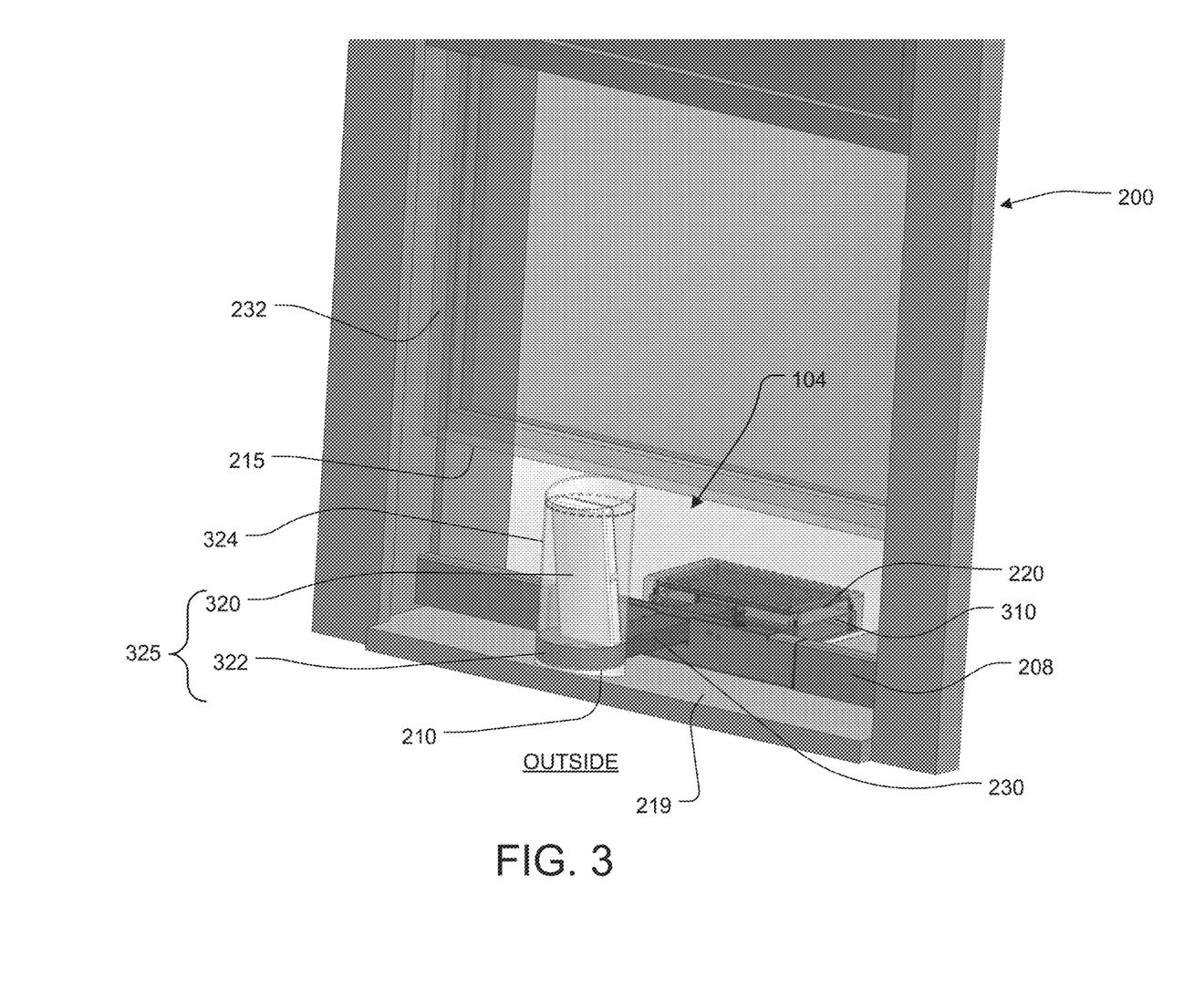
FIG. 3 is a perspective view with housing components of the endpoint node shown in phantom.

FIG. 3 is a diagram of the endpoint node 102, in which the enclosure components of the endpoint node 104 are shown in phantom relative to window 200. The view of the figure is from the outside of the residence, and the bottom sash 232 of the window 200 is partially open. The ODU 210 is placed upon/mounted to an outside portion of the windowsill 219.

The IDU 220 is coupled to the ODU 210 via the bridge unit 230 that projects through the sealing member 208. The DU 220 includes a local wireless and/or wired module 310 that maintains a wireless or wired local area network for the subscriber's premises. In this case, the local wireless module 310 directly transmits and receives information with network devices at the subscriber's premise. In other cases, the local wireless module 310 transmits and receives information with a local wireless access point/router that then maintains the wireless local area network.

The ODU 210 includes an extremely high frequency (EHF) communication module 320 (referred to hereinafter as an EHF module 320) that has one or more integrated patch array antennas with transceivers, in one example. The EHF module 320 transmits and receives information in high frequency signals to and from the aggregation node 102. A servo controlled motor unit 322 supports and mechanically steers the EHF module 320 (i.e., steers the patch array antennas of the EHF module 320). A weather hardened enclosure (referred to as a "Radome") 324 is designed for weather and UV protection (i.e., to protect the EHF module 320 and motor unit 322 from weather conditions) but is transparent to the high frequencies. In some embodiments, a heater (not shown) is also installed within the enclosure 324. In some embodiments, the combination of the EHF module 320 and the servo controlled motor unit 322 can be referred to as a steerable antenna module 325.

The servo controlled motor unit 322 preferably includes a 2-axis pan-tilt mount or gimbal that is controlled by one or more motors. The pan-tilt mount is used to rotate the EHF module 320 so that the integrated patch array antenna can be accurately aligned for communicating with the aggregation node 102. Specifically, the motor unit 322 rotates the EHF module 320 around the vertical axis or in an azimuth direction and further tips the EHF module 320 around a horizontal axis or in the elevation direction. This movement allows the integrated patch array antenna(s) of the EHF module 320 to be pointed at the phased array antenna system 103 of the aggregation node 102.

This movement of the EHF module 320 also allows a dynamic repositioning of the network without requiring site visits by installers. For example, in the case of a failure of a particular aggregation node 102 or the addition of a new aggregation node 102 to the overall local terrestrial network system (e.g., system 100), the EHF module 320 will automatically re-point to a secondary/backup/new aggregation node 102. Additionally, in the case of a site that is served by multiple aggregation nodes 102, a separate path may be extended facilitating redundancy and enabling multi-path network coding to extend at the IP packet level.

In some embodiments, the motors (e.g., stepper motors) of the motor unit 322 are controlled by a controller unit on the IDU 220. In one example, the motor unit 322 is capable of moving the EHF module 320 to enable a 75 degree rotation or more in the azimuth direction and a +25 degree rotation or more in the elevation direction.

In some embodiments, the one or more antennas of the steerable antenna module 325 may be parabolic dish antennas with or without subreflectors, or one or more patch array antennas.

Figure 4:
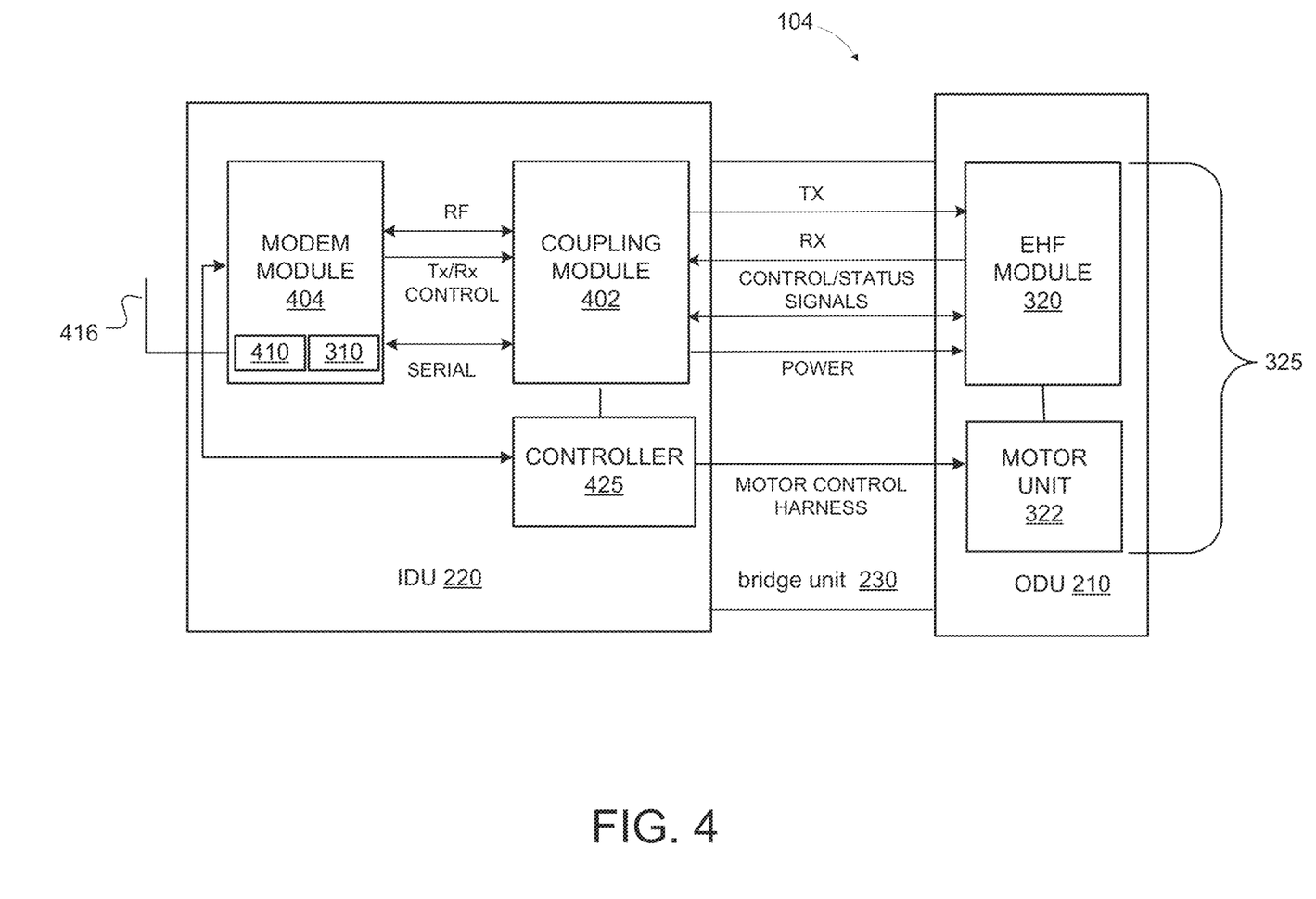
FIG. 4 is a block diagram that shows components of the endpoint node.

FIG. 4 is a block diagram of the endpoint node 104 showing its components or modules. The components span across portions of the endpoint node 104 including the IDU 220, bridge unit 230 and ODU 210. The IDU 220 contains electronic circuits, primarily on two printed circuit board assemblies (PCBAs) referred to as a WiFi modem module 404 and a coupling module 402. The ODU 210 includes the EHF module 320 and the servo controlled motor unit 322.

According to some embodiments, the WiFi modem module 404 is a printed circuit board assembly, which includes: 1) a 802.11ac 4×4 radio chipset for the internet (referred to herein as internet WiFi chipset 410), 2) a 802.11ac n×n chipset, such as, (3×3) radio chip set (referred to herein as local WiFi chipset or local wireless module 310) for establishing a wireless data connection to a wireless router or access point via WiFi antennas 416 on the IDU 220, and 3) and a Bluetooth low energy (BLE) radio (not otherwise shown) for system configuration. Preferably, the modem module 404 also includes one or more wired and or optical network jacks such as optical fiber connectors or RJ-45 jacks.

In one embodiment, off-the-shelf printed circuit board assemblies (PCBAs) are used for the WiFi modem module 404 e.g., AP148 with 2 radio PCIe (Peripheral Component Interconnect Express) modules. In some embodiments, the local chipset/local wireless module 310 is mounted directly on the main PCB without interconnections through interboard connectors. In some embodiments, a QCA9980 PCIe card that has a ~5 GHz operating frequency is used for the internet WiFi chipset 410.

Coupling module 402 couples the internet WiFi chipset 410 with the EHF module 320. In some embodiments, WiFi signals from the internet WiFi chipset 410 are communicated to the EHF module 320 via the coupling module 402. The EHF module 320 receives the WiFi signals from the coupling module 402, upconverts the WiFi frequencies to high frequencies, and communicates with the aggregation node 102 at the high frequencies. Similarly, the module 220 receives high frequency signals from the aggregation node 102, downconverts the high frequency signals to WiFi signals, and provides the WiFi signals to the coupling module 402 that in turn provides the WiFi signals to the internet WiFi chipset 410. The ODU 210 contains circuitries for the high frequency antennas, frequency conversion, amplifiers, and LNBs (low noise block down converters) on the EHF module 320. The LNB is a combination of low-noise amplifier, frequency mixer, local oscillator and intermediate frequency amplifier. RF signals, Tx/Rx control signals, and serial signals are exchanged between the modem module 404 and the coupling module 402.

The IDU 220 includes a controller 425 that controls various functions of the EHF module 320 and gimbal functions of the motor unit 322. In some embodiments, the EHF module 320 measures the signal strength/power associated with the high frequency signals received from the aggregation node 102. This measurement is referred to as a received signal strength indicator (RSSI) value associated with the received high frequency signals. The EHF module 320 uses the RSSI value to determine an initial pointing direction for the integrated patch array antennas(s) of the EHF module 320. The initial pointing direction is communicated to the controller 425 via the coupling module 402. The controller 425 causes the motor unit 322 to move the EHF module 320 (i.e., steer the integrated patch array antenna(s)) in an azimuth and/or elevation direction according to the initial pointing direction. In some embodiments, packet error rate measurements are performed at the initial pointing direction. These measurements are used to determine a refined pointing direction. The controller 425 then steers the integrated patch array antenna(s) according to the refined pointing direction via the motor unit 322. The refined pointing direction allows the antenna(s) to be steered such that the signal quality of the link formed between the aggregation node 102 and the endpoint node 104 is enhanced.

Extending through the bridge unit 230 are cables supporting two or more transmit connections TX and cables supporting two or more receive connections RX, electrical connections for control and status signals, power to the EHF module 320, and a motor control harness between the controller 425 and the motor unit 322.

In some implementations, the radio on the modem module 404 has a TX Enable control signal that is asserted while the radio is transmitting. The coupling module 402 buffers this signal, and passes it along to the EHF module 320. In one embodiment, the radio on the modem module 404 also has a RX Enable control signal that is used to control the RX path of the SPDT (single pole double throw) switch between the radio and its antenna. The coupling module 402 buffers this signal and passes it along to the EHF module 320. In some implementations, T/R switches connect the unidirectional transmission lines on the coupling module 402 to the bi-directional transmission lines used on the modem module 404.

Further details regarding the high frequency system 100, components of the aggregation node 102 and the endpoint node 104 and their deployment are described in detail in U.S. application Ser. No. 15/418,256 filed on Jan. 27, 2017, entitled "Star Topology Fixed Wireless Access Network", which is incorporated herein by reference in its entirety.

Figure 5A:
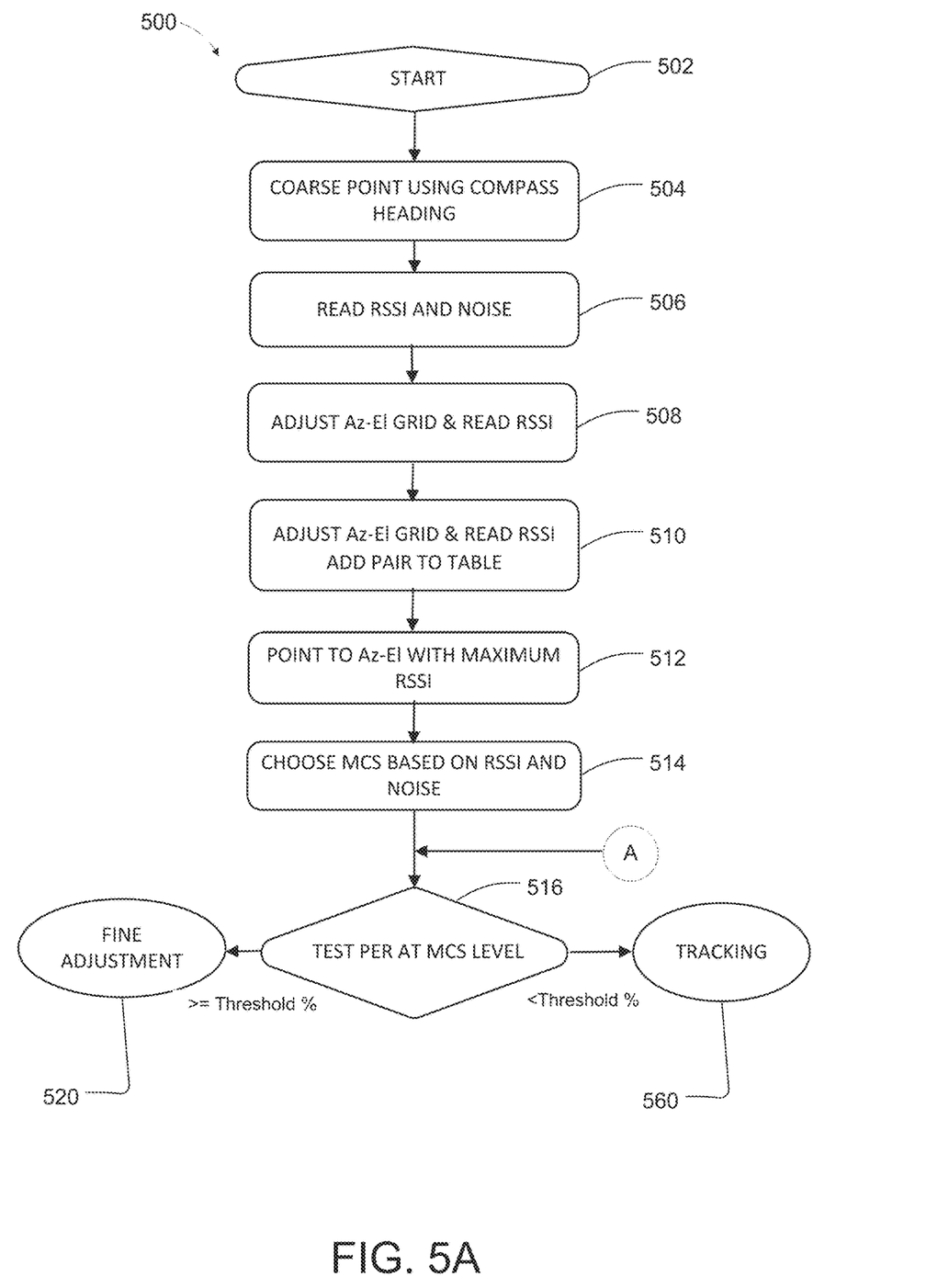
FIGS. 5A-5C are flowcharts illustrating a pointing algorithm for determining a pointing direction for the endpoint node, where the flowchart of FIG. 5B provides detail for the flowchart of FIG. 5A, and where the flowchart of FIG. 5C provides detail for both the flowcharts of FIG. 5A and FIG. 5B.
Figure 5B:
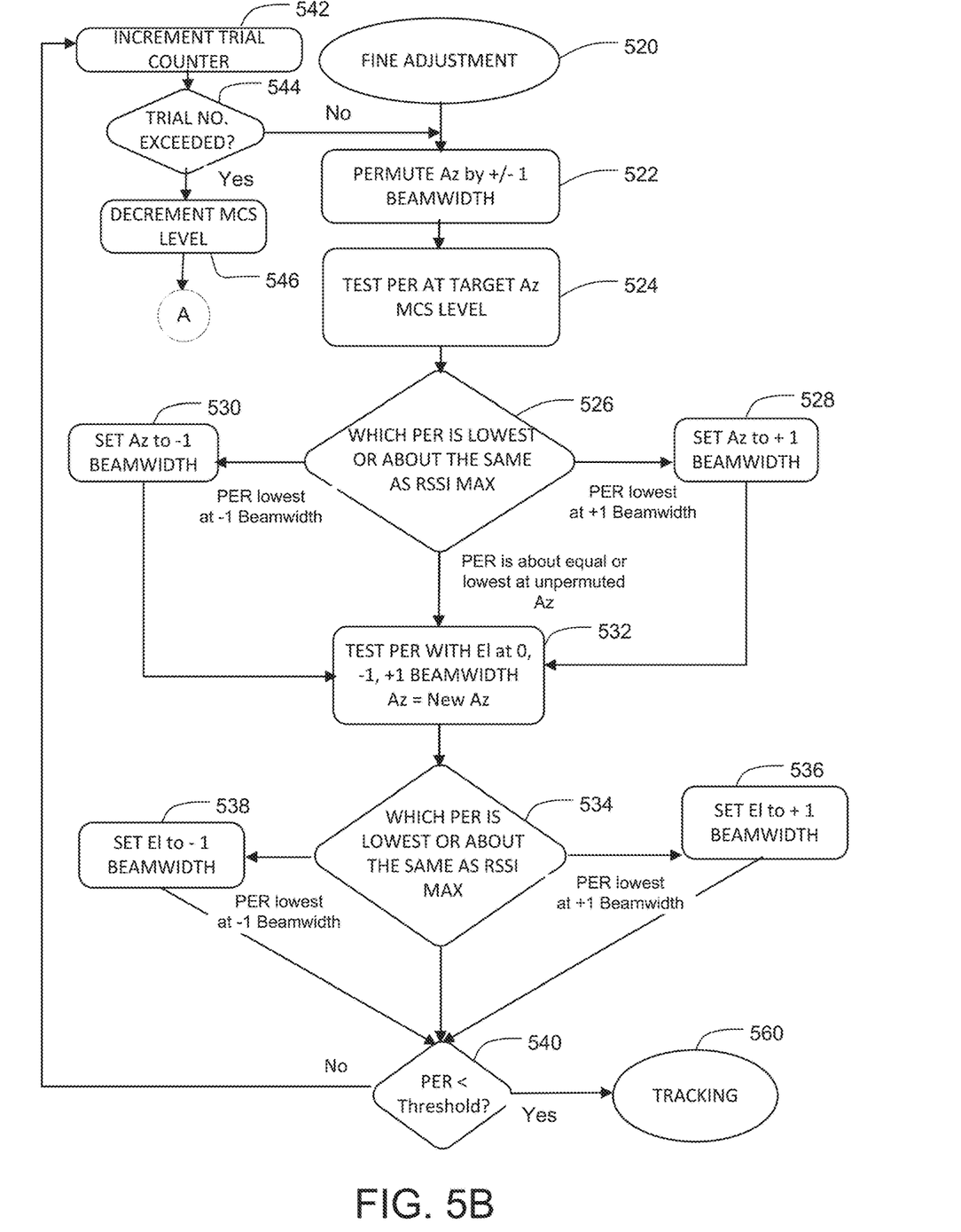
Figure 5C:
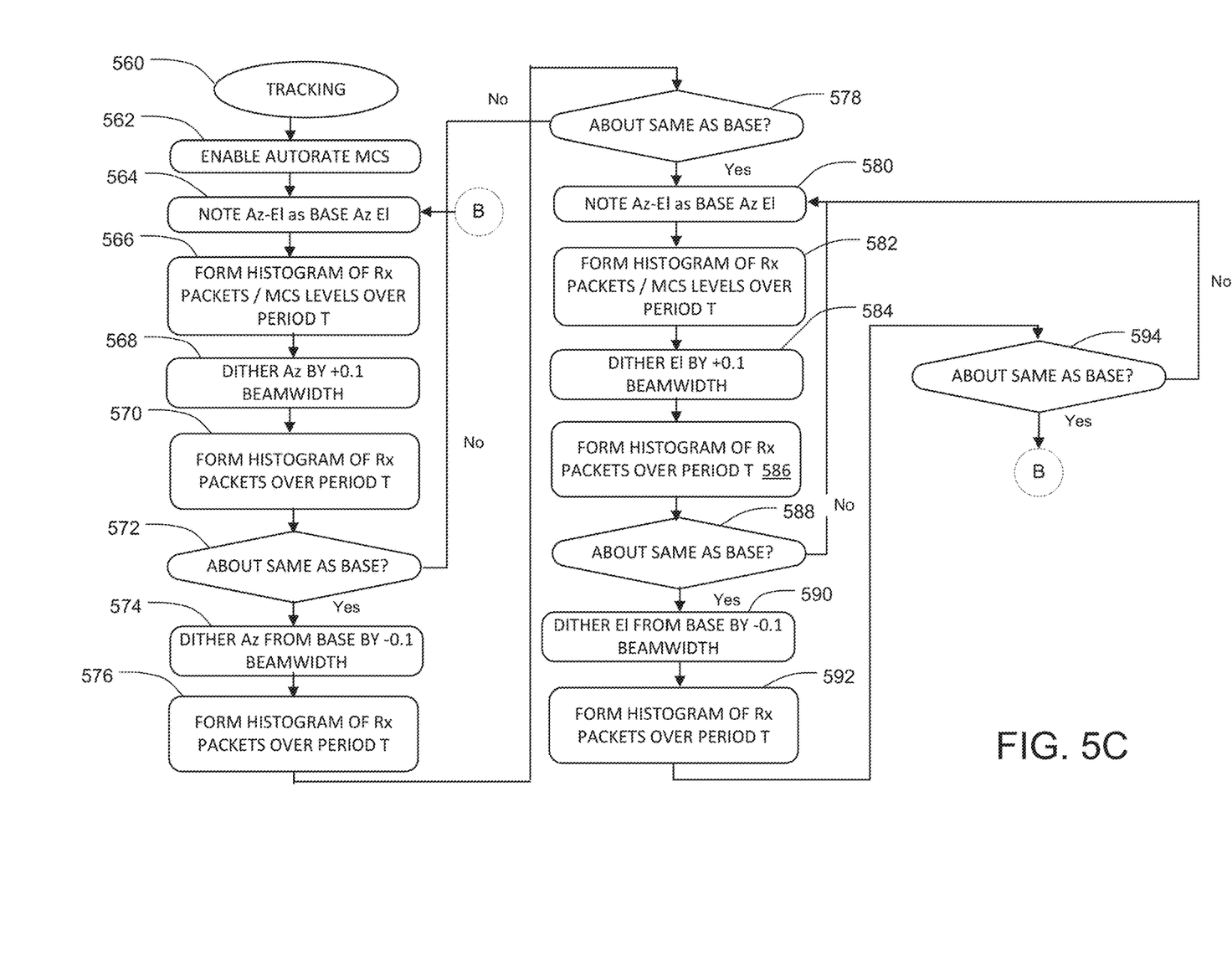

FIGS. 5A-5C are flowcharts illustrating a pointing algorithm for determining a pointing direction for the endpoint node 104 (in particular, the EHF module 320 of the endpoint node 104). In some embodiments, the modem module 404, controller 425, and the EHF module 320, in collaboration, perform the various steps of FIGS. 5A-5C.

The pointing algorithm starts at step 502 in FIG. 5A. At step 504, the EHF module 320 coarsely points towards the aggregation node 102 using a compass heading. In some embodiments, the controller 425 receives the coarse pointing direction from a compass and points the EHF module 320 according to the coarse pointing direction via the motor unit 322. In some embodiments, the coarse pointing direction includes a coarse azimuth direction and a coarse elevation direction.

At step 506, RSSI and noise measurements are performed at the EHF module 320 while the EHF module 320 points in the coarse pointing direction. In some embodiments, RSSI and noise values are measured for high frequency signals received from the aggregation node 102. The RSSI and noise values indicate channel conditions associated with the high frequency data communication link between the endpoint node 104 and the aggregation node 102. At steps 508 and 510, an Az-El grid (including the coarse azimuth and coarse elevation directions) is adjusted and the corresponding RSSI values at the adjusted azimuth and elevation directions are measured at the EHF module 320. The adjusted Az-El grid values and the corresponding RSSI values are added to a table maintained at the EHF module 320.

At step 512, of the entries in the table, an Az-El grid with the maximum RSSI value is selected. The selected azimuth and elevation directions are communicated by the EHF module 320 to the controller 425 via the coupling module 402. The controller 425 causes the motor unit 322 to move the EHF module 320 according to the selected azimuth and elevation directions. These selected azimuth and elevation directions are collectively referred to as the initial pointing direction for the EHF module 320.

At step 514, a modulation and coding scheme (MCS) level or index is selected based on the RSSI and noise measurements associated with the initial pointing direction. In some embodiments, the MCS level is selected from a set of MCS levels supported by the 802.11ac standard. Each MCS level in the set indicates at least a modulation type and a coding rate that can be used for the high frequency data link.

At step 516, the modem module 404 in collaboration with or independently of the controller 425, tests the packet error rate or ratio (PER) at the selected MCS level. PER is defined as the number of incorrectly received data packets divided by the total number of received packets. When the calculated PER is greater than or equal to a threshold value, a determination is made that the initial pointing direction needs to be adjusted, which initiates a fine adjustment operation at step 520. On the other hand, when the calculated PER is less than the threshold value, a determination is made that a tracking operation needs to be performed, which initiates the tracking algorithm at step 560. The threshold value is typically about 2~5%, The MCS level is chosen so that at that level of Carrier to Noise Ratio, the result should be nearly zero packet errors. If there are many more packet errors, then it means that while Carrier to Noise Ratio is adequate, a more optimal antenna alignment may find an alignment with less multipath scattering and reflective obstructions and thus a more optimal receiving condition may result.

FIG. 5B illustrates the steps of the fine adjustment operation 520 in FIG. 5A.

At step 522, the initial azimuth value (associated with the initial pointing direction) is permuted by +1 and −1 beamwidth. At step 524, the PER measurements are performed at the target azimuth MCS level (i.e., PER measurements associated with the permuted azimuth values and the selected. MCS level are performed). At step 526, a determination is made regarding which of the three PER measurements (i.e., PER measurements associated with initial unpermuted azimuth value, initial azimuth value +1 beamwidth, and initial azimuth value −1 beamwidth) is lowest or about the same as the maximum RSSI value. When the PER is lowest at initial azimuth value +1 beamwidth, the azimuth value is set to an adjusted value of initial azimuth value +1 beamwidth, at step 528. When the PER is lowest at initial azimuth value −1 beamwidth, the azimuth value is set to an adjusted value of initial azimuth value −1 beamwidth, at step 530. When the PER is about equal or the lowest at the unpermuted initial azimuth value, the azimuth value need not be adjusted, and the method transitions to step 532. Upon completion of steps 528 and 530, the method also transitions to step 532.

At step 532, PER measurements associated with unpermuted and permuted elevation values are performed. With the azimuth value set to one of the unpermuted initial azimuth, the initial azimuth value +1 beamwidth, or initial azimuth value −1 beamwidth (as determined at steps 528, 530, or 532), a first PER measurement is associated with the unpermuted initial elevation value (i.e., initial elevation value +/−0 beamwidth), a second PER measurement is associated with the initial elevation value +1 beamwidth, and the third PER measurement is associated with the initial elevation value −1 beamwidth.

At step 534, a determination is made regarding which of the three PER measurements (i.e., PER measurements associated with unpermuted initial elevation value, initial elevation value +1 beamwidth, and initial elevation value −1 beamwidth) is lowest or about the same as the maximum RSSI value. When the PER is lowest at initial elevation value +1 beamwidth, the elevation value is set to an adjusted value of initial elevation value +1 beamwidth, at step 536. When the PER is lowest at initial elevation value −1 beamwidth, the elevation value is set to an adjusted value of initial elevation value −1 beamwidth, at step 538. When the PER is about equal or the lowest at the unpermuted initial elevation value, the elevation value need not be adjusted, and the method transitions to step 540. Upon completion of steps 538 and 536, the method also transitions to step 540.

At step 540, a determination is made regarding whether the calculated PER is less than the threshold value. When the calculated PER is less than the threshold value, a tracking operation is commenced at step 560. In some embodiments, the fine adjustment operation is performed/repeated until the calculated PER is determined to be less than the threshold value.

On the other hand, when the calculated PER is greater than or equal to the threshold value, a trial counter is incremented at step 542. At step 544, a determination is made regarding whether a number of trials has exceeded a predefined number. When the number of trials has not exceeded the predefined number, the fine adjustment operation is repeated starting at step 522.

When the number of trials has exceeded the predefined number, the MCS level is decremented at step 546 and the algorithm returns to step 516 in FIG. 5A, indicated by encircled reference numeral A. Here, the modem module 404 in collaboration with or independently of the controller 425, tests the PER at the decremented MCS level. Either the fine adjustment operation or the tracking operation can be commenced (at steps 520 and 560 respectively) based on whether the PER is greater than, equal to, or less than the threshold value.

In some embodiments, the controller 425 causes the motor unit 322 to move the EHF module 320 according to the finely adjusted azimuth and elevation directions determined based on the fine adjustment operation 520.

As a result, in one example, adjusting the pointing direction of the endpoint node 104 includes testing the PER at different azimuth values, and selecting a particular azimuth value with a lowest PER. In another example, adjusting the pointing direction includes testing the PER at the particular azimuth value and different elevation values, and selecting a particular elevation value with a lowest PER. For this purpose, the controller 425 is configured to select a particular azimuth value of the different azimuth values with a lowest PER, and/or to select a particular elevation value of the different elevation values with a lowest PER.

FIG. 5C illustrates the steps of the tracking algorithm/operation 560 in FIGS. 5A and 5B.

At step 562, an MCS level is automatically selected. The current azimuth and elevation values are set as base azimuth and base elevation values, at step 564. At step 566, a base histogram of received packets and MCS levels is formed over a period of time T (for the current/base azimuth value).

At step 568, the current/base azimuth value is dithered/adjusted by +0.1 beamwidth. At step 570, a first adjusted histogram of received packets and MCS levels is formed over the period of time T (for the adjusted azimuth value from step 568).

At step 572, a determination is made regarding whether the first adjusted histogram is approximately the same as the base histogram. When the first adjusted histogram is not the same as the base histogram, the adjusted azimuth value is set as the base azimuth value (the elevation value set at step 564 remains the same) and the steps 566-570 are repeated. At step 574, when the first adjusted histogram is the same as the base histogram, the base azimuth value is dithered by −0.1 beamwidth. At step 576, a second adjusted histogram of received packets and MCS levels is formed over the period of time T (for the adjusted azimuth value from step 574).

At step 578, a determination is made regarding whether the second adjusted histogram is approximately the same as the base histogram. When the second adjusted histogram is not the same as the base histogram, the adjusted azimuth value is set as the base azimuth value at step 564, and steps 566-570 are repeated.

When the second adjusted histogram is the same as the base histogram, the adjusted azimuth value is set as the base azimuth value at step 580. At this point, adjustments to the azimuth value, if needed, have been made while the elevation value remains the same as the base elevation value set at step 564. At step 582, a third adjusted histogram of received packets and MCS levels is formed over the period of time T (for the azimuth and elevation values from step 580). At step 584, the elevation value is dithered/adjusted by +0.1 beamwidth. At step 586, a fourth adjusted histogram of received packets and MCS levels is formed over the period of time T (for the adjusted elevation value from step 584).

At step 588, a determination is made regarding whether the fourth adjusted histogram is approximately the same as the base histogram. When the fourth adjusted histogram is not the same as the base histogram, the adjusted elevation value is set as the base elevation value (the azimuth value set at step 580 remains the same) and the steps 582-586 are repeated. At step 590, when the fourth adjusted histogram is the same as the base histogram, the elevation value is dithered by −0.1 beamwidth. At step 592, a fifth adjusted histogram of received packets and MCS levels is formed over the period of time T (for the adjusted elevation value from step 590).

At step 594, a determination is made regarding whether the fifth adjusted histogram is approximately the same as the base histogram. When the fifth adjusted histogram is not the same as the base histogram, the adjusted elevation value is set as the base elevation value at step 580, and the steps following step 580 are repeated. On the other hand, when the fifth adjusted histogram is the same the base histogram, the adjusted elevation value is set as the base elevation value at step 564, and the steps following step 564 are repeated. This is indicated by encircled reference B.

In some embodiments, the tracking operation 560 (including adjustment of azimuth and elevation directions) is performed until the aggregation node 102 is accurately tracked by the endpoint node 104. In other words, the various steps of the tracking operation provide a tracked azimuth and tracked elevation value for the endpoint node 104. In some embodiments, the controller 425 causes the motor unit 322 to move the EHF module 320 according to the tracked azimuth and elevation directions.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for determining a pointing direction for an endpoint node in a terrestrial extra high frequency data communication system, the method comprising:
   determining a pointing direction based on packet error rate (PER) measurements associated with a high frequency data communication link between the endpoint node and an aggregation node;
   steering one or more antennas of the endpoint node to point to the aggregation node according to the pointing direction;
   selecting a modulation and coding scheme (MCS) level;
   measuring a PER at the MCS level; and
   adjusting the pointing direction when the PER is greater than or equal to a threshold value.

2. The method of claim 1, wherein determining the pointing direction comprises determining azimuth and elevation values to be used for steering the one or more antennas.

3. The method of claim 1, further comprising selecting the MCS level based on a received signal strength indicator (RSSI) value and noise.

4. The method of claim 1, wherein adjusting the pointing direction comprises:
   testing the PER at different azimuth values; and
   selecting a particular azimuth value with a lowest PER.

5. The method of claim 4, wherein adjusting the pointing direction further comprises:
   testing the PER at the particular azimuth value and different elevation values; and
   selecting a particular elevation value with a lowest PER.

6. The method of claim 1, further comprising performing a tracking operation when the PER is less than the threshold value.

7. The method of claim 6, wherein performing the tracking operation comprises:
   determining a tracked azimuth value and a tracked elevation value based on packets received over a period of time.

8. An endpoint node that communicates with an aggregation node via high frequency data communication links, the endpoint node comprising:
   an endpoint controller configured to determine a pointing direction based on measurement of packet error rate (PER) at different azimuth and elevation values; and
   a steerable antenna module configured to steer one or more antennas based on the pointing direction;
   wherein the endpoint controller is further configured to select a particular azimuth value of the different azimuth values with a lowest PER.

9. The endpoint node of claim 8, wherein the steerable antenna module comprises a motor unit that mechanically steers the one or more antennas.

10. The endpoint node of claim 8, wherein the different azimuth values comprise an initial azimuth value +/−1 beamwidth.

11. The endpoint node of claim 8, wherein the different elevation values comprise an initial azimuth value +/−1 beamwidth.

12. An endpoint node that communicates with an aggregation node via high frequency data communication links, the endpoint node comprising:

an endpoint controller configured to determine a pointing direction based on measurement of packet error rate (PER) at different azimuth and elevation values; and a steerable antenna module configured to steer one or more antennas based on the pointing direction;

wherein the endpoint controller is further configured to select a particular elevation value of the different elevation values with a lowest PER.

13. The endpoint node of claim 8, wherein the steerable antenna module comprises a communication module that includes one or more integrated patch array antennas with transceivers as the one or more antennas.

* * * * *